United States Patent [19]
Peterkofsky et al.

[11] 3,899,458
[45] Aug. 12, 1975

[54] ETHERIFIED TRIMETHYLOLATED CROTONYLIDENEDIUREA AND ITS USE IN ALKYD RESIN COATING COMPOSITIONS

[75] Inventors: Alan L. Peterkofsky, Newark; James E. Tracy, Bernardsville; Paul M. Schumacher, Hackettstown, all of N.J.

[73] Assignee: Celanese Corporation, New York, N.Y.

[22] Filed: Sept. 12, 1973

[21] Appl. No.: 396,943

Related U.S. Application Data

[63] Continuation of Ser. No. 135,749, April 20, 1971, abandoned.

[52] U.S. Cl. ............ 260/21; 117/132 B; 117/161 K; 117/161 LN; 260/22 CQ; 260/256.4 C
[51] Int. Cl. ...... B32b 27/06; C09d 3/52; C09d 3/66
[58] Field of Search ...................................... 260/21

[56] References Cited
UNITED STATES PATENTS

| | | | |
|---|---|---|---|
| 3,654,193 | 4/1972 | Seiner | 117/37 R |
| 3,678,128 | 7/1972 | Riemhofer et al. | 117/161 K |
| 3,808,039 | 4/1974 | Kuzma | 260/21 |

*Primary Examiner*—Ronald W. Griffin
*Attorney, Agent, or Firm*—Thomas J. Morgan; John A. Shedden

[57] ABSTRACT

Etherified trimethylolated crotonylidenediurea prepared from crotonylidenediurea or its derivative trimethylolated crotonylidenediurea, the etherified compounds being valuable cross-linking agents in alkyd resin coating compositions.

9 Claims, No Drawings

ETHERIFIED TRIMETHYLOLATED CROTONYLIDENEDIUREA AND ITS USE IN ALKYD RESIN COATING COMPOSITIONS

This is a continuation of application Ser. No. 135,749, filed Apr. 20, 1971, now abandoned.

BACKGROUND OF THE INVENTION

Alkyd resin enamels useful for coating kitchen appliances, washing machines, automobiles, and the like, must meet very rigorous specifications in view of their exposure to various chemicals, including detergents, caustics, acids, alcohols and stainings agents; in addition, the enamels must exhibit satisfactory gloss, hardness, impact resistance, curing rates, etc. Needless to say, millions of man hours have gone into the development of suitable enamels to meet the present annual market for millions of pounds. As is the case with all high-demand products, research persists in a continuing effort to improve on existing products.

A baked enamel presently enjoying substantial commercial success is prepared from alkyd resins containing aminoplast resins of the urea-formaldehyde and melamine-formaldehyde type, including the butylated derivatives thereof. The alkyd resin components are generally oil-modified polyester reaction products of polybasic acids, e.g., a phthalic acid or its anhydride, and a polyol, e.g., a triol such as glycerol. Optionally, a minor proportion of a monobasic acid or a dibasic acid, such as benzoic acid, substituted benzoic acid, adipic acid, or the like, may be present.

Of the condensation products of amines or amides, such as triazines, diazines, triazoles, guanidines, guanamines, with aldehydes, such as formaldehyde and acetaldehyde, the melamine-formaldehyde resins have, in general, provided the most desirable overall enamel properties as aminoplast components of alkyd resins. Urea-formaldehyde resins have been quite successful, also, not so much because of their overall effectiveness, particularly when compared with melamine-aldehyde resins, but because urea-aldehyde resins are significantly less expensive. Obviously, there is a real need for an aminoplast-type crosslinking agent of the calibre of a melamine-aldehyde aminoplast, yet without the cost handicap. This has been a long-standing need which heretofore had scant hope of being fulfilled.

THE INVENTION

According to the present invention a novel class of compounds has been found with unusual "aminoplastic properties", so to speak, in enamels of the alkyd resin type, particularly with respect to hardness, chemical resistance, curing rates, and other like properties. Not only are these compounds generally superior to the urea-aldehyde aminoplasts but they are comparable and superior, as will be seen hereinafter, in significant respects to the relatively expensive melamine-aldehyde type resins.

The novel compounds of the present invention have the general formula:

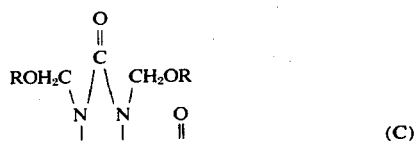

(C)

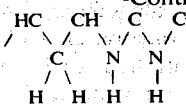

wherein R is H or the residue of a monohydric alcohol, at least one of said R moieties being the residue of a monohydric alcohol.

As will be seen hereinafter in more detail, compounds of the above formula (C) are derived from crotonylidenediurea (A), known as CDU, or its trimethylolated derivative, viz., trimethylolated crotonylidenediurea (B), referred to herein as TMCDU, and prepared as taught in copending U.S. application Ser. No. 53,028, filed July 7, 1970, now abandoned, by James E. Tracy, Alan L. Peterkofsky and William Lindlaw.

Etherification with a monohydric alcohol provides compounds of the formula (C), above, which are soluble in organic solvents and help impart this same solubility to alkyd resin coating compositions containing these compounds.

Typical monohydric alcohols useful for the etherification reactions contemplated herein are branched and straight-chain alkanols having up to about 12 carbon atoms; aromatic monohydric alcohols, e.g., benzyl alcohol, and the like; cycloalkanols, e.g., cyclohexanol, cyclopentanol, cycloheptanol, and the like, usually having about 4 to about 8 carbon atoms in the ring; monoethers of glycols, such as Cellosolve* and Carbitol* compositions; and substituted monohydric alcohols wherein the substituent is inert in that it does not enter into or hinder the etherification reaction or deleteriously affect, say, the effectiveness of the ultimate coating composition or the compounding thereof. Typical substituents are halogen atoms, such as chlorine and bromine, and other like inert moieties.

*(Trademarks for monoethers of glycols sold by Union Carbide Corporation, New York, New York.)

The alkyd resin components contemplated herein are generally prepared, as indicated hereinabove, from polybasic acids and polyfunctional alcohols, usually with a minor amount of oil modifier. Typical polybasic acids are phthalic acid, isophthalic acid, succinic acid, maleic acid, sebacic acid, adipic acid, linoleic acid, trimellitic acid, fumaric acid, and anhydrides of these acids; typical polyfunctional alcohols contemplated herein are glycerol, pentaerythritol, mannitol, sorbitol, ethylene glycol, trimethylolpropane, trimethylolethane, diethylene glycol, 2,3-butylene glycol, and other like polyols. The triols are generally preferred As also indicated hereinbefore, the alkyd resins within the purview of the instant discovery usually contain a minor proportion of oil modifier, usually a non-drying oil modifier, such as coconut oil or other saturated oil. Other oil modifiers which may be used, however, are drying or semi-drying oils, such as fish oils, linseed oil, soybean oil, or the like.

Or course, the alkyd resin may contain, generally in relatively minor amounts, other modifying components known in the art, such as are intended to modify certain properties for specific end uses. For example, oil-free alkyd-aminoplast resin coating compositions containing aliphatic or aromatic diepoxides are reported to have enhanced chemical resistance.

The etherified trimethylolated crotonylidehediurea compounds (C), for convenience referred to herein as etherified TMCDU, may be prepared in several ways. For example, crotonylidenediurea CDU is reacted with a formaldehyde-monohydric alcohol solution, such as Formcel*, under controlled conditions of temperature and pH. Formcel* is a trademark of Celanese Corporation, New York, New York for aqueous alcohol-formaldehyde solutions; methyl Formcel and butyl Formcel refer to aqueous alcohol-formaldehyde solution mixtures, respectively, wherein the alcohol components are methanol and butanol. The resulting product is the etherified TMCDU shown in formula (C), above. When methyl Formcel is the reactant, R of formula (C) is $CH_3$; likewise, when butyl Formcel is the reactant, R is $CH_3CH_2CH_2CH_2—$.

If desired, CDU may first be reacted with formaldehyde and methylolated according to copending U.S. Application Ser. No. 53,028 alluded to above and the resulting methylolated product TMCDU reacted with, say, a lower alkanol and the novel product of the present invention, viz., etherified TMCDU, recovered.

The above just-mentioned processes may be described in equation form as follows:

EQUATION I

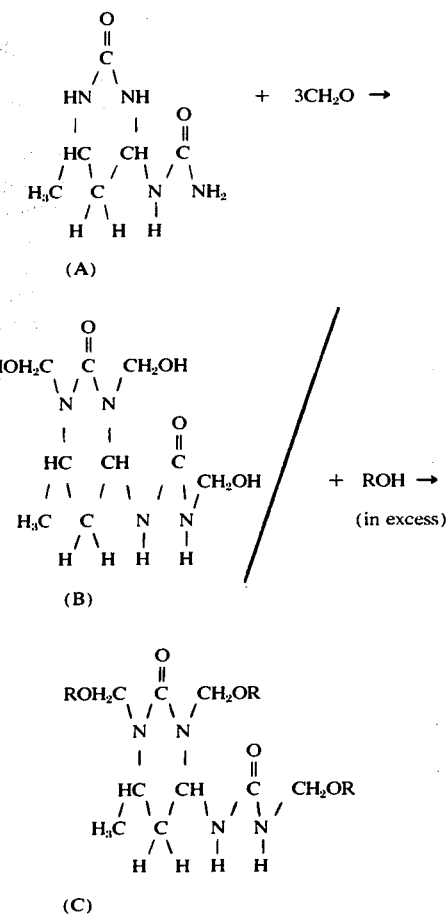

Alternatively, a butyl Formcel solution, or like reactant, may be employed in a one-step process as follows:

EQUATION II

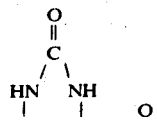

EQUATION II -Continued

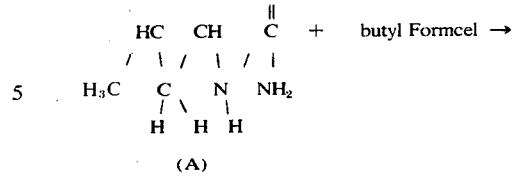

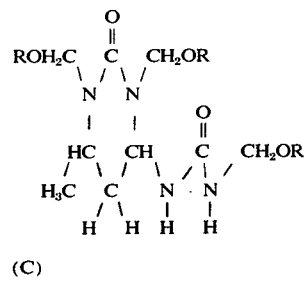

viz., butylated TMCDU wherein R is either H or $—CH_2CH_2CH_2CH_3$ (butyl), at least one R being butyl.

Reactant (A), above, viz. crotonylidenediurea, may be prepared by reacting urea with acetaldehyde in an acidic hydroxylic medium, e.g., as described in U.S. Letters Patent No. 3,190,741. While it has been found that crotonylidenediurea suitable for use in the present invention is conveniently and preferably prepared according to the following procedure, it should be understood that other methods of synthesis can be used, parts and percentages being by weight unless otherwise indicated: Thus, 270 parts of urea is added to a mixture of 99 parts of acetaldehyde and 600 parts of distilled water in a suitable conventional reaction vessel. The resultant solution is heated to a temperature of about 60°C. Thirty parts of phosphoric acid (catalyst) is then added and the temperature is thereafter maintained at between about 60°C and about 70°C for 1 hour. Crotonylidenediurea begins to separate from the reaction mixture as formed. The reaction mixture is subsequently cooled to ambient temperature whereupon crystallization of the product crotonylidenediurea continues and is completed. The product is separated from the supernatant liquid by filtration, washed with water, and dried in vacuo. The yield of white, solid crotonylidenediurea (135.3 grams) is 69.9 percent of the theoretical, based on the weight of acetaldehyde. Elemental analysis of the product corresponds to the formula $C_6H_{12}O_2N_4$ and the infrared spectrum thereof (Nujol mull) is identical to that reported in the literature (cf. Japanese Letters Patent No. 492,348) for crotonylidenediurea.

Reaction of crotonylidenediurea with formaldehyde pursuant to Equation I, above, is preferably accomplished by contacting crotonylidenediurea with between about 2.80 and about 5.0 molar equivalents of formaldehyde in a hydroxylic medium. The hydroxylic solvent used should be capable of being separated from the aminoplast material (B) formed in the reaction by evaporative means. The preferred solvent is water. The total concentration of the reactants in the hydroxylic medium is not critical.

In especially preferred modes of Equation I, reaction is conducted with formalin, i.e., an aqueous solution of formaldehyde in which the concentration of the latter is between about 35 and about 40 percent, or with paraformaldehyde, an oligomer, as the HCHO source. The amount of formaldehyde used can range, as indicated above, between about 2.80 and about 5.0 molar proportions, preferably between about 2.90 and about 3.05 molar proportions, per molar proportion of crotonylidenediurea. The use of formaldehyde in amounts such that the molar ratio of formaldehyde to crotonylidenediurea is less than about 2.80:1 is not as desirable because the trimethylol crotonylidenediurea would in such case be contaminated with substantial quantities of materials which could be deleterious in the finished resin. For this same reason, the use of formaldehyde: crotonylidenediurea molar ratios in excess of about 3.05:1 is less desirable, and the use of ratios in excess of about 5:1 is particularly undesirable.

The reaction between crotonylidenediurea and formaldehyde is catalysed by acid or base. Reaction can also be carried out without added catalyst. While the natural acidity of formalin is sufficient, reaction times are much longer. In effect, also, acidic pH's are created during the reaction by conversion of some of the $CH_2O$ to formic acid. In aqueous media, the reaction can be conducted at a pH of less than or greater than 7. Desirably, the reaction is conducted under basic conditions. Preferably, the reaction is conducted at a pH of greater than about 8 and less than about 12, with a pH of between about 9 and about 10 being especially preferred.

The temperature and pressure at which the crotonylidenediurea and formaldehyde are reacted are not critical. Desirably, the reaction is conducted at an elevated temperature and atmospheric pressure, with a temperature corresponding to the atmospheric reflux temperature of the reaction menstruum being preferred. The time required for completion of the reaction is generally less than 1 hour. The exact time required depends upon the reaction temperature, concentration of the catalyst (i.e., the pH) and reactants. A conventional titration method for determining when a particular reaction system has reached equilibrium is referred to in connection with Example I hereinbelow.

The reaction product mixture may be filtered to remove insolubles prior to reacting with an etherifying reactant. To obtain an etherified TMCDU product suitable for use in alkyds, e.g., solvent-soluble, water is removed. When etherifying with butanol, for example, the water can be removed by azeotropic distillation as the etherification is carried out. A similar process may be followed with other alcohols contemplated herein, such as cyclohexanol, benzyl alcohol, and the like.

With methanol, however, the bulk of the water is generally evaporated before etherification is performed. The water remaining after etherification can then be removed by co-distillation of methanol and water from the resulting resin product (methylated trimethylolated crotonylidenediurea) until essentially all the water is removed. The water-free resin can then be diluted to the desired solids content with a non-aqueous solvent. Thus, in the case of methylation, it is usually simpler to strip the aqueous TMCDU solution to near dryness, add methanol, carry out etherification, and strip off any water remaining after the first stripping step, as well as water of reaction created during etherification, as a methanol co-distillate.

A wide range of temperatures may be used. Broadly, temperatures between about 30°C and about 230°C are contemplated herein, depending upon the monohydric alcohol employed.

Good results are achieved, for example, at atmospheric reflux using butanol. When methylating, however, lower temperatures, such as 55°C, provide very good results. Normally, temperatures in the range of about 45°C to about 205°C are employed. Of course, higher temperatures are indicated should pressures above atmospheric pressure be desired; likewise, subatmospheric pressures dictate proportionately lower temperatures. Another virtue of the present invention is that it permits not only a wide choice of temperatures and pressures, but it functions well as a continuous, semi-continuous or batch process.

Generally, a broad pH range provides suitable results. Reaction is best carried out, however, at an acid pH in the range of about 1.5 to about 6.5, preferably between about 2.3 and about 5.5.

Concentrations best suited for the monohydric alcohol reaction step may vary considerably and generally range between about 2.80 and about 6.0 molar equivalents, preferably between about 3.0 and about 5.5 molar equivalents of the monohydric alcohol, based on the molar amount of TMCDU present in the reactant mixture. In the case of methanol, however, a range between about 2.8 and about 20.0, preferably between about 5.0 and 12.0, molar equivalents is desirable. Consequently, an overall range for the monohydric alcohol is from about 2.8 to about 20.0 molar equivalents.

The one-step process of Equation II, above, has a number of inherent advantages. In the first place, the aqueous monohydric alcohol-formaldehyde solution (hydroxylic medium is preferred) may be selected so as to expeditiously and efficiently provide high yields of etherified TMCDU by what may be an in situ conversion from CDU to TMCDU to etherified (e.g., alkylated) TMCDU.

Typically, an aqueous 55% methyl Formcel solution containing 34–35% methanol and 55% formaldehyde (percentages by weight) is readily reacted at controlled temperatures and pH with CDU to provide, in a direct, one-step process, the corresponding etherified trimethylolated crotonylidenediurea. Although a wide variety of pH conditions may be used quite successfully, it is preferred to operate at a pH in the range of about 1.5 to about 6.5, preferably about 2.3 to about 5.5.

While best results are achieved at the atmospheric reflux temperature of the aqueous reaction mixture, the one-step process admits of a wide range of temperature and pressure conditions. Generally, temperatures in the range of about 30°C to about 230°C, normally between about 45°C and about 205°C, are used. In other words the temperatures, pressures, concentrations and other conditions described with respect to the etherification step (2) of Equation I are suitable and desirable in the instant one-step process of Equation II, for much the same reasons given in discussing step (2) of Equation I. Likewise, the one-step process employed may be continuous, semi-continuous or batch.

The following examples disclose illustrative methods for preparing the novel compounds of the present invention and teach representative uses for these compounds in typical coating compositions. Unless otherwise stated, parts and percentages given in the examples are by weight. It should be clearly understood, also, that the examples are illustrative, generally preferred embodiments which are not intended to unduly limit the scope of the present invention; in other words, it will be apparent to the person skilled in the art that numerous modifications, extensions and variations are clearly within the spirit and scope of the invention.

EXAMPLE I

To a suitable reaction vessel equipped with conventional agitation means are charged 239 grams (2.94 moles) of 37 percent formalin ("uninhibited") and 15 grams of a 10 percent aqueous solution of sodium carbonate. To the resulting mixture is added, with agitation, 172 grams (1.0 mole) of crystalline crotonylidenediurea. The reaction mixture, which has a pH of between about 9 and about 9.5, is heated to reflux temperature over the course of about 20 minutes and maintained at the reflux temperature for about 5 minutes. The reaction mixture is then cooled to ambient temperature, the pH is adjusted to 7.0, and the reaction mixture filtered to remove insolubles. The clear filtrate contains 2.8 percent free formaldehyde as determined by the "sodium sulfite method" described in Walker, Formaldehyde, 3d ed., p. 486 (Reinhold, N.Y. 1964). The concentration of aminoplast material in the aqueous filtrate is 60 percent by weight as determined gravimetrically, i.e., by evaporating an aliquot sample of the solution at 70°C for 6 hours and weighing the residue. The aminoplast material, of course, is trimethylolated crotonylidenediurea (B).

EXAMPLE II

This example illustrates a variant of the procedure used in Example I to produce the trimethylolated crotonylidenediurea:

To a suitable reaction vessel equipped with conventional agitation means are charged 4055 grams (50 moles) of 37 percent formalin ("uninhibited") and 150 grams of a 10 percent aqueous solution of sodium carbonate. To the resulting mixture is added, with agitation, 1720 grams (10 moles) of crystalline crotonylidenediurea. The reaction mixture having a pH of between about 9 and about 9.5, is then heated at reflux temperature for 5 minutes and cooled to ambient temperature. An additional charge of 150 grams of 10 percent aqueous sodium carbonate and 1204 grams (7 moles) of crotonylidenediurea are added and the reaction mixture is again heated to reflux temperature and maintained thereat for 30 minutes. Upon recooling the reaction mixture to ambient temperature, neutralizing the pH, and filtering, a solution of trimethylol crotonylidenediurea is obtained which contains 2.7 percent unreacted formaldehyde.

EXAMPLE III

The clear filtrate of Example I is now charged to a reaction vessel equipped with a phase separation head, and the pH is adjusted to a value of 3.0 by the addition of 25% aqueous formic acid. An amount (370 parts) of butanol is added to the reaction vessel and the system is heated to reflux temperature (about 100°C) and azeotropic distillation of water from the reaction mixture is continued until the temperature of the resin system reaches 117°C. The system is then cooled to ambient temperature and the product butylated trimethylol crotonylidenediurea adjusted to a solids content of 50%.

EXAMPLE IV

The clear filtrate of Example II, above, is charged to a reaction vessel equipped with a phase separation head, and the pH is adjusted to a value of 3.0 by the addition of 25% aqueous formic acid. An amount (5000 grams; 50 moles) of cyclohexanol is added to the reaction vessel and the system heated to reflux temperature and azeotropic distillation of water from the reaction mixture is continued until the temperature reaches about 130°C. To guard against product resin decomposition or polymerization, azeotropic distillation during the final stages is carried out under vacuum. The system is then cooled to ambient temperature and the product, cyclohexylated trimethylol crotonylidenediurea, adjusted to the desired solids content.

EXAMPLE V

An amount (272.0 parts) of 55% methyl Formcel containing 149.6 parts of formaldehyde (55% by weight), 95.2 parts of methanol (35% by weight) and 10% water is charged to a reaction vessel, and the pH is adjusted to a value of 3.0 by the addition of sufficient 25% aqueous formic acid. To the reaction vessel is then added 172.0 parts of CDU. The system is heated to reflux temperature (about 96°C) and maintained thereat for approximately 1 hour. At the end of this period, the temperature of the reaction mixture is reduced to approximately 55°C, followed by the addition of 262.0 parts of methanol. This temperature is maintained for a period of about 2 hours, during which time the pH is kept constant at 3.0 by the addition of appropriate quantities of 25% formic acid. At the end of the two-hour holding period, the reaction system is cooled to ambient temperature and the pH adjusted to 7.8 with 10 N sodium hydroxide. The reaction mixture is then filtered and evaporated under reduced pressure to remove excess methanol and water of reaction. The resulting residue of methylated trimethylol crotonylidenediurea is re-dissolved in sufficient isopropanol to produce a solution containing 50% solids.

EXAMPLE VI

Butyl Formcel (206.0 parts) containing 82.4 parts of formaldehyde (40% by weight) and 109.2 parts of butanol (53% by weight) and n-butanol (62.0 parts) are charged to a reaction vessel equipped with a phase separation head, and the pH is adjusted to 2.3 by the addition of 25% aqueous formic acid. An amount (86.0 parts) of CDU is added to the reaction vessel and the system is heated to reflux temperature (about 100°C) and azeotropic distillation of water from the reaction mixture is continued until the temperature of the resin system reaches 117°C. The system is then cooled to ambient temperature and the product butylated trimethylol crotonylidenediurea adjusted to a solids content of 50% by the addition of butanol.

EXAMPLE VII

Example V is repeated in every essential respect with the exception that methyl Formcel is replaced by a mixture of 405 parts of 37% formalin (uninhibited) and 688 parts of benzyl alcohol. The system is likewise heated to atmospheric reflux temperature for one hour and then cooled to approximately 55°C by the addition of another 500 parts of benzyl alcohol. Subsequent to this step Example V is followed in every essential detail and benzylated trimethylol crotonylidenediurea thus produced.

EXAMPLE VIII

Crotonylidenediurea (344.0 grams), 92% flake paraformaldehyde (196.0 grams, containing 180 grams of formaldehyde and 16 grams of water), n-butanol (518.0 grams), and 10% aqueous sodium carbonate solution (30 grams) are charged to a reaction vessel equipped with a phase separation head. The mixture is heated to reflux (about 101°–103°C) and held thereat for 75 minutes. The pH at the end of this reflux period is 7.2. Aqueous formic acid, 88% (5.0 grams), is then added to lower the pH to 5.3, and water is removed from the reaction mixture by azeotropic distillation until the temperature of the resin system reaches 117°C. After cooling to ambient temperature, the reaction mixture is filtered to give a clear solution of the product, butylated trimethylol crotonylidenediurea.

EXAMPLE IX

Crotonylidenediurea (344.0 grams), 92% flake paraformaldehyde (329.8 grams, containing 303.4 grams of formaldehyde and 26.4 grams of water), water (34.3 grams), and methanol (287.5 grams) are charged to a reactor and heated to reflux (about 94°C). After refluxing for 45 minutes, the ph is 5.4. Aqueous formic acid, 88%, is added to lower the pH to 3.1. Refluxing is continued for an additional 20 minutes, then the mixture is cooled to 55°C and additional methanol (416.5 grams) is added. The mixture is maintained at 55°C for 4 hours, cooled to ambient temperature, and filtered to give a clear solution of the product, methylated trimethylol crotonylidenediurea.

The products of the above examples are tested and compared with well-known crosslinking agents in a typical white enamel alkyd resin for coating compositions, derived from Duraplex*ND-77B resin (Duraplex* is a trademark for a short oil coconut alkyd resin sold by Rohm and Haas).

(*Trademark for resins sold by Rohm and Haas Co., Philadelphia, Pa.)

Baking enamels are prepared at alkyd/amine ratios of 90/10, 80/20 and 70/30 and are baked at 250°F on a conventional metal substrate, viz. Parker Test Panels, cold rolled steel, SPRA Bonderite[R] 100 Treatment, 4 inches × 8 inches × 24 GA. and Parker Test Panels, Aluminum 3003-H14, Bonderite[R] 721 treatment, 4 inches × 8 inches (for flexibility tests). Purchased from Hooker Chemical Co., Parker Division, Detroit, Michigan. Paint films of approximately 1.5 mil. thickness (dry) are obtained by drawing down films of 0.003 inch wet thickness using a Bird Film Applicator (Gardner Laboratory, Bethesda, Md.). Wet films are allowed to air dry for about 20 minutes, and then oven cured at specified temperatures for specified times. Rate of cure is determined by plotting development of hardness (pencil test) vs. cure temperature and time. Gloss: Standard 60° gloss angle measurement determined on a Hunterlab Model D16 Glossmeter (Hunter Associates Laboratories, Inc., Fairfax, Va.) in accordance with ASTM D523.

The etherified trimethylolated crotonylidenediurea products of Examples V and VI, above, and the Uformite* resins described hereinafter are formulated into baking enamels (alkyd/amine ratios of 90/10, 80/20 and 70/30) according to the conventional method and formulation shown in the following table:

TABLE I

WHITE BAKING ENAMEL

| Roller Mill Grind | Pounds | Pounds | Pounds |
| --- | --- | --- | --- |
| Titanium Dioxide | 16.6 | 16.6 | 16.6 |
| Duraplex ND-77B (60% Solids) | 11.7 | 11.7 | 11.7 |
| Mix With | | | |
| Duraplex ND-77B (60% Solids) | 13.3 | 10.5 | 7.8 |
| Amino Resin (50% Solids) | 3.4 | 6.7 | 10.0 |
| Xylol | 8.6 | 8.1 | 7.5 |
| Catalyst Solution* | 0.5 | 0.5 | 0.5 |
| Physical Constants | | | |
| Percent Solids | 62.1 | 62.1 | 62.1 |
| Pigment/Vehicle | 1/1 | 1/1 | 1/1 |
| Alkyd/Amino | 90/10 | 80/20 | 70/30 |

*Catalyst is 20% solution of p-toluene sulfonic acid in methanol

Test panels prepared from these formulations exhibited the properties shown in Table II, below:

TABLE II

PROPERTIES OF ENAMEL PANELS
(Oven Time = 30 Minutes)

| Aminoplast: | Temp. | Conc. (by weight) | Pencil Hardness | Reverse Impact (inch-lbs) | Conical Mandrel | 1% Tide* 50 Hours | 5% NaOH 5-24[1] | Merthiolate 1-24[2] |
| --- | --- | --- | --- | --- | --- | --- | --- | --- |
| BUTYLATED UREA-HCHO, UFORMITE F-200E | 250°F | 90/10 | — | — | — | — | — | — |
| | | 80/20 | 4 | 2-4 | 0.25 | 0 | 2-0 | **S-S |
| | | 70/30 | 7 | 2-4 | 1.75 | 0 | 8-0 | ***NS-S |
| | 300°F | 90/10 | — | — | — | — | — | — |
| | | 80/20 | 4 | 2-4 | 0.25 | 0 | 2-0 | S-S |
| | | 70/30 | 7 | 2-4 | 1.63 | 0 | 2-0 | S-S |
| METHYLATED TMCDU PREPARED IN EXAMPLE V | 250°F | 90/10 | 4 | 4-6 | — | 0 | 2-0 | S-S |
| | | 80/20 | 6 | 2-4 | 0.38 | 0 | 2-2 | S-S |
| | | 70/30 | 6 | 2-4 | 0.88 | 0 | 2-2 | S-S |
| | 300°F | 90/10 | 4 | 6-8 | — | 0 | 2-0 | S-S |
| | | 80/20 | 6 | 2-4 | 0.13 | 0 | 2-2 | S-S |
| | | 70/30 | 7 | 2-4 | 1.10 | 0 | 2-2 | S-S |
| BUTYLATED TMCDU PREPARED IN EXAMPLE VI | 250°F | 90/10 | 4 | 8-10 | — | 0 | 2-0 | S-S |
| | | 80/20 | 7 | 2-4 | 1.0 | 0 | 8-0 | NS-NS |
| | | 70/30 | 7 | 2-4 | 1.25 | 0 | 10-4 | NS-S |
| | 300°F | 90/10 | 4 | 6-8 | — | 0 | 2-0 | S-S |
| | | 80/20 | 6 | 2-4 | 0.63 | 0 | 8-2 | NS-S |
| | | 70/30 | 7 | 2-4 | 1.88 | 0 | 10-2 | NS-S |

TABLE II – Continued

PROPERTIES OF ENAMEL PANELS
(Oven Time = 30 Minutes)

| Aminoplast: | Temp. | Conc. (by weight) | Pencil Hardness | Reverse Impact (inch-lbs) | Conical Mandrel | 1% Tide* 50 Hours | 5% NaOH 5-24[1] | Merthiolate 1-24[2] |
|---|---|---|---|---|---|---|---|---|
| BUTYLATED MELAMINE-HCHO. UFORMITE MM-55. | 250°F | 90/10 | 4 | 10-12 | 0 | 0 | 4-0 | S-S |
| | | 80/20 | 7 | 6-8 | 0.25 | 6 | 8-4 | S-S |
| | | 70/30 | 7 | 2-4 | 4,13 | 8 | 10-8 | NS-S |
| | 300°F | 90/10 | 4 | 10-12 | 0 | 0 | 5-2 | S-S |
| | | 80/20 | 8 | 2-4 | 1.0 | 6 | 8-4 | S-S |
| | | 70/30 | 8 | 0-2 | 6,13 | 8 | 10-8 | NS-NS |

All panels had commercially acceptable gloss.
*Tide is a trademark for a detergent sold by Procter & Gamble, Cincinnati, Ohio
**S = Stain
***NS = No Stain Scale
HB-F = 4
F-H = 5
H-2H = 6
2H-3H = 7
3H-4H = 8

| Aminoplast: | Temp. | Conc. (by weight) | Ethanol 1-24[2] | Acetone 1-24[2] | 19% HCl 1-24[2] | 49% $H_2SO_4$ 1-24[2] | 100% HOAc 1-24[2] |
|---|---|---|---|---|---|---|---|
| BUTYLATED UREA-HCHO. UFORMITE F-200E | 250°F | 90/10 | — | — | — | — | — |
| | | 80/20 | 2-2 | 2-2 | 2-0 | 2-2 | 6-0 |
| | | 70/30 | 8-2 | 6-6 | 2-0 | 2-2 | 6-0 |
| | 300°F | 90/10 | — | — | — | — | — |
| | | 80/20 | 2-2 | 0-0 | 2-0 | 2-2 | 6-0 |
| | | 70/30 | 2-2 | 0-0 | 2-0 | 2-2 | 6-0 |
| METHYLATED TMCDU PREPARED IN EXAMPLE V | 250°F | 90/10 | 2-0 | 2-2 | 2-0 | 2-2 | 6-0 |
| | | 80/20 | 2-2 | 6-6 | 2-0 | 2-2 | 10-0 |
| | | 70/30 | 8-8 | 2-2 | 2-0 | 4-2 | 0-0 |
| | 300°F | 90/10 | 2-2 | 2-0 | 2-0 | 4-2 | 6-0 |
| | | 80/20 | 2-2 | 2-0 | 2-0 | 4-2 | 6-0 |
| | | 70/30 | 8-8 | 8-8 | 2-0 | 2-2 | 6-0 |
| BUTYLATED TMCDU PREPARED IN EXAMPLE VI | 250°F | 90/10 | 8-2 | 0-0 | 2-0 | 8-2 | 2-0 |
| | | 80/20 | 8-8 | 0-0 | 2-0 | 10-2 | 10-6 |
| | | 70/30 | 8-8 | 6-6 | 2-0 | 2-2 | 0-0 |
| | 300°F | 90/10 | 2-2 | 0-0 | 2-0 | 4-2 | 0-0 |
| | | 80/20 | 4-2 | 6-0 | 2-0 | 4-2 | 6-0 |
| | | 70/30 | 8-8 | 6-6 | 2-0 | 2-2 | 6-0 |
| BUTYLATED MELAMINE-HCHO. UFORMITE MM-55. | 250°F | 90/10 | 2-2 | 0-0 | 10-2 | 10-8 | 2-0 |
| | | 80/20 | 8-8 | 6-6 | 8-8 | 10-2 | 10-0 |
| | | 70/30 | 10-8 | 6-6 | 8-0 | 10-6 | 6-0 |
| | 300°F | 90/10 | 2-2 | 0-0 | 10-2 | 10-10 | 2-0 |
| | | 80/20 | 4-4 | 6-6 | 10-0 | 10-10 | 6-0 |
| | | 70/30 | 8-8 | 8-8 | 8-0 | 10-0 | 8-6 |

[1] Recorded after 5 hours and after 24 hours
[2] Recorded after 1 hour and after 24 hours Chemical Tests
0 = denuded → 10 = unaffected As is evident from Table II, above, the novel methylated TMCDU (methylated trimethylol crotonylidenediurea) compound of the present invention exhibits very desirable physical properties and chemical resistance, generally at least comparable and sometimes superior to the butylated urea-formaldehyde resins. The novel butylated TMCDU (butylated trimethylol crotonylidenediurea) compound of the present invention, on the other hand, is generally superior to the commercial butylated urea-formaldehyde resin in physical properties and chemical resistance and compares favorably in some respects with commercial butylated melamine-formaldehyde.

For example, the rate of cure at 250°F and 300°F, as determined by pencil hardness, of the Example V and VI products at alkyd/amino concentrations of 80/20 surpassed both commercial resins under identical curing conditions and concentrations.

The tests for physical and chemical properties reported in Table II, above, are conventional.

Conical Mandrel - ASTM D 522
Reverse Impact - (Gardner Laboratories, Bethesda, Md.)
Pencil Hardness - 3B, 2B, B, HB, F, H, 2H, 3H, 4H (increasing hardness)
1% Tide/50 hr. - ASTM D 2248
Stain and Chemical Resistance Tests - ASTM D 1308

While the tests carried out hereinabove use alkyd/amino resin weight concentrations of 90/10, 80/20 and 70/30, based on the total weight of the alkyd and aminoplast components, these are merely illustrative. If desired, concentrations in the range of about 95/5 to about 40/60 may be used in preparing various coating compositions, depending upon the end use intended for these compositions; generally, a concentration in the range of about 93/7 to about 55/45 is preferred.

Pursuant to statutory requirements, there are described above the invention and what are now considered its best embodiments. It should be understood, however, that the invention can be practiced otherwise

What is claimed is:

1. A coating composition comprising an alkyd resin and an etherified trimethylolated crotonylidenediurea (C) of the formula

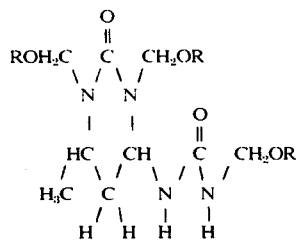

wherein R is H or the residue of a monohydric alcohol, at least one of said R moieties being the residue of a monohydric alcohol.

2. The composition of claim 1 wherein the monohydric alcohol is selected from a branched or straight chain, substituted or unsubstituted alkanol having up to about 12 carbon atoms; a substituted or unsubstituted aromatic monohydric alcohol; and a substituted or unsubstituted cycloalkanol having from about 4 to about 8 carbon atoms in the ring.

3. The composition of claim 2 wherein the monohydric alcohol is methanol.

4. The composition of claim 2 wherein the monohydric alcohol is butanol.

5. The composition of claim 2 wherein the monohydric alcohol is benzyl alcohol.

6. The composition of claim 2 wherein the monohydric alcohol is cyclohexanol.

7. The composition of claim 2 wherein component (C) is present in the concentration of about 5 to about 60 percent by weight of the total of the alkyd resin and component (C).

8. The composition of claim 2 for use as a baking enamel wherein component (C) is present in the concentration of about 7.0 to about 45 percent by weight of the total of the alkyd resin and component (C).

9. In the process of preparing baked enamel coatings composed of an alkyd resin and an aminoplast the improvement wherein said aminoplast comprises etherified trimethylolated crotonylidenediurea of the formula:

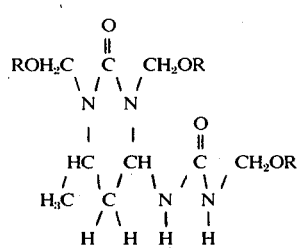

wherein R is H or the residue of a monohydric alcohol selected from the group consisting of methyl, butyl, benzyl and cyclohexyl, at least one of the R moieties being said residue of a monohydric alcohol.

* * * * *